United States Patent [19]

Jaksic

[11] Patent Number: 5,016,490
[45] Date of Patent: May 21, 1991

[54] CABLE CONTROL SYSTEM FOR DUAL ACTUATORS

[75] Inventor: Miroslav Jaksic, Farmington Hills, Mich.

[73] Assignee: Babcock Industries Inc., Fairfield, Conn.

[21] Appl. No.: 351,969

[22] Filed: Jul. 10, 1989

[51] Int. Cl.⁵ .............. F16C 1/10; B60T 1/00; F16B 9/00

[52] U.S. Cl. .............. 74/501.5 R; 74/502.6; 74/502.4; 188/2 D; 188/196 B; 192/111 A; 403/197

[58] Field of Search ........... 74/501.5 R, 502.4, 502.6, 74/502.5; 188/196 B, 204 R, 2 D; 192/111 A; 403/197

[56] References Cited

U.S. PATENT DOCUMENTS

| | | | |
|---|---|---|---|
| 3,036,668 | 3/1959 | Falk et al. | 188/2 D |
| 3,782,507 | 1/1974 | Shreve | 188/2 D |
| 4,448,090 | 5/1984 | Carré et al. | 74/501.5 R |
| 4,621,937 | 11/1986 | Maccuaig | 403/197 |
| 4,716,781 | 1/1988 | Dussault | 74/501.5 R |
| 4,787,263 | 11/1988 | Jaksic | 74/502.4 |
| 4,838,109 | 6/1989 | Stewart | 74/501.5 R |
| 4,847,973 | 7/1989 | Lundeen | 74/502.6 |

Primary Examiner—Rodney H. Bonck
Assistant Examiner—Winnie Yip
Attorney, Agent, or Firm—Barnes, Kisselle, Raisch, Choate, Whittemore & Hulbert

[57] ABSTRACT

A cable control system for dual actuators wherein movement of a strand of a first cable is transmitted equally to second and third strands of respective actuators which includes a device comprising a one-piece body having spaced parallel walls with aligned openings therethrough. The first cable extends through the opening and the second cable is fastened at the other end of the device such that when the first cable is actuated, a force is transmitted to one of the actuators through the first cable and the reaction force on a conduit surrounding the first cable is transmitted through the device through the second cable to the other of the actuators through the device.

21 Claims, 5 Drawing Sheets

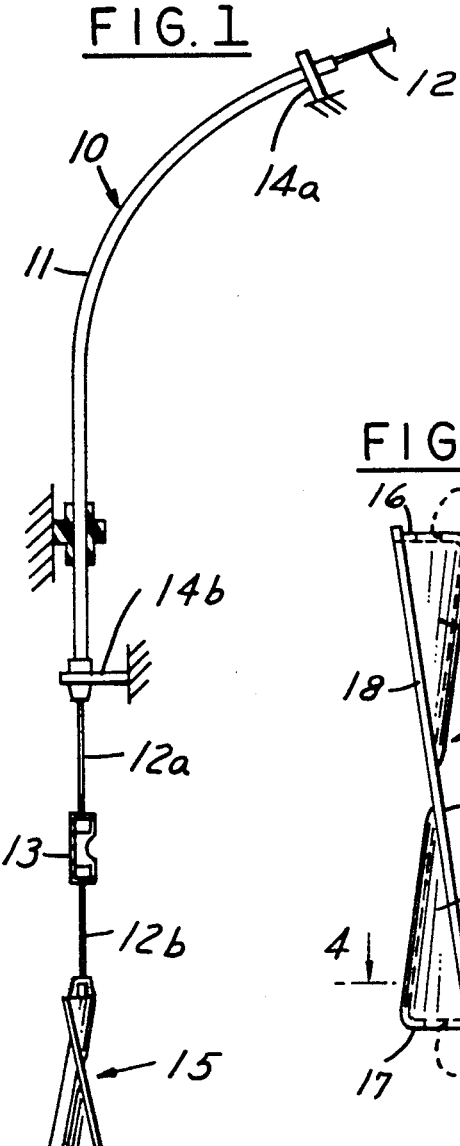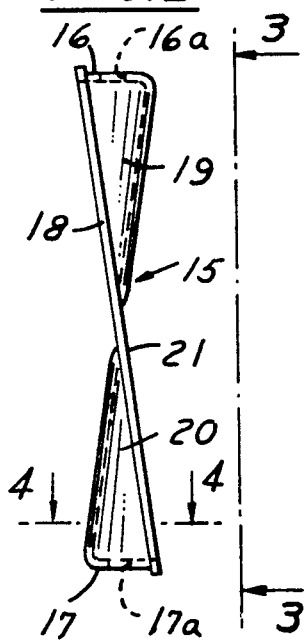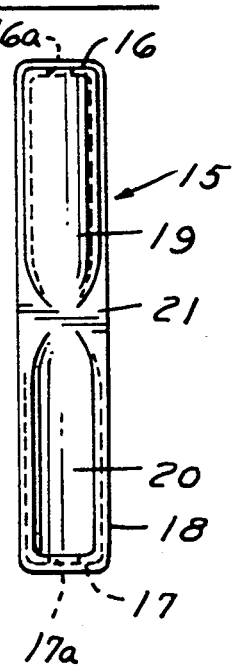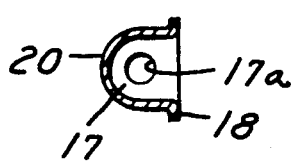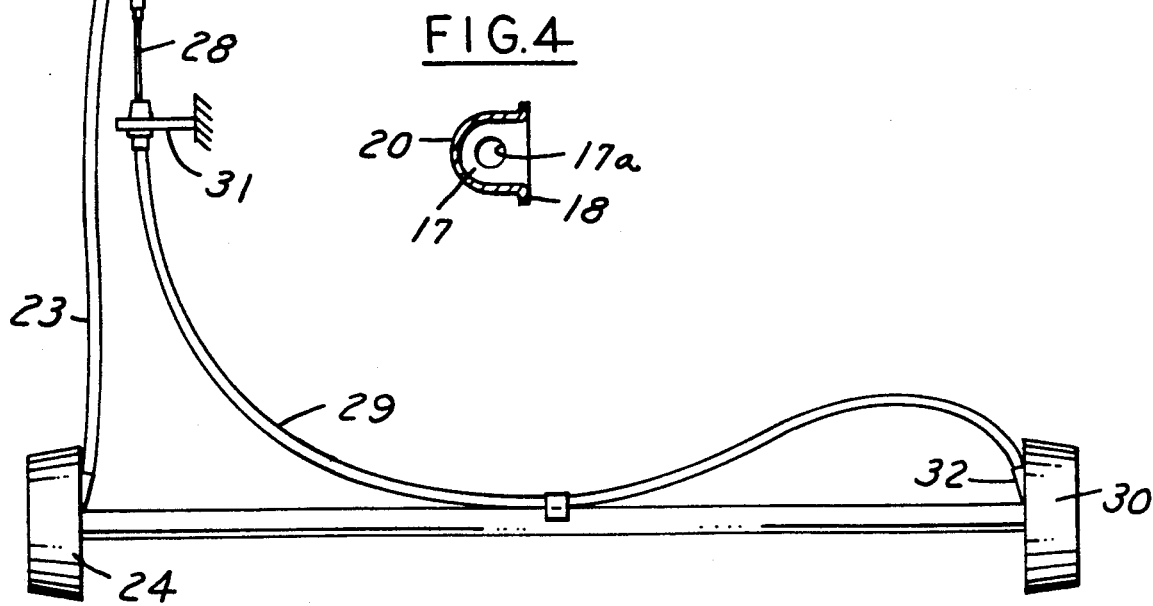

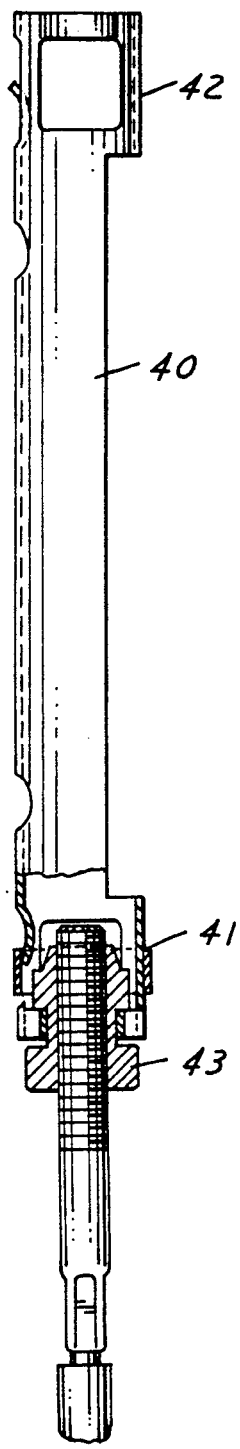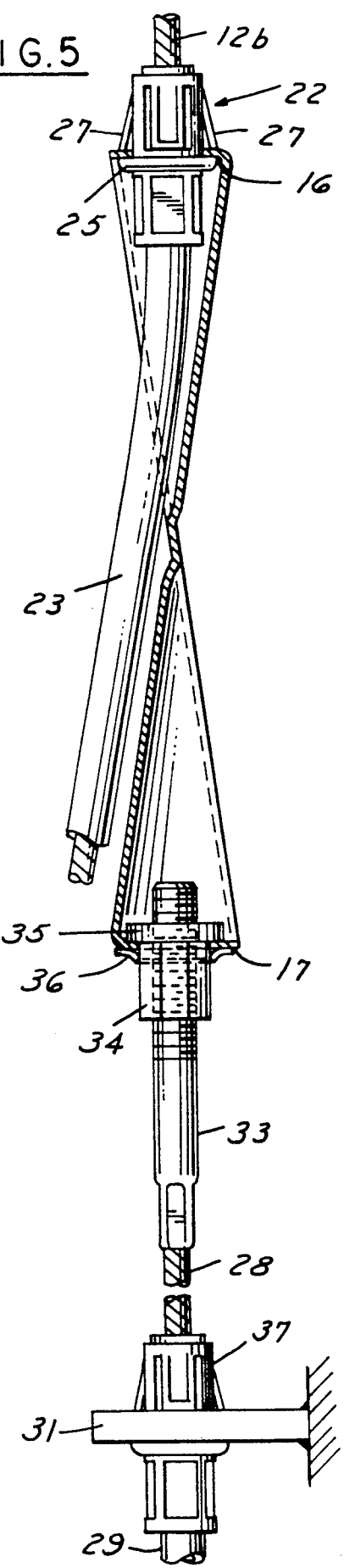

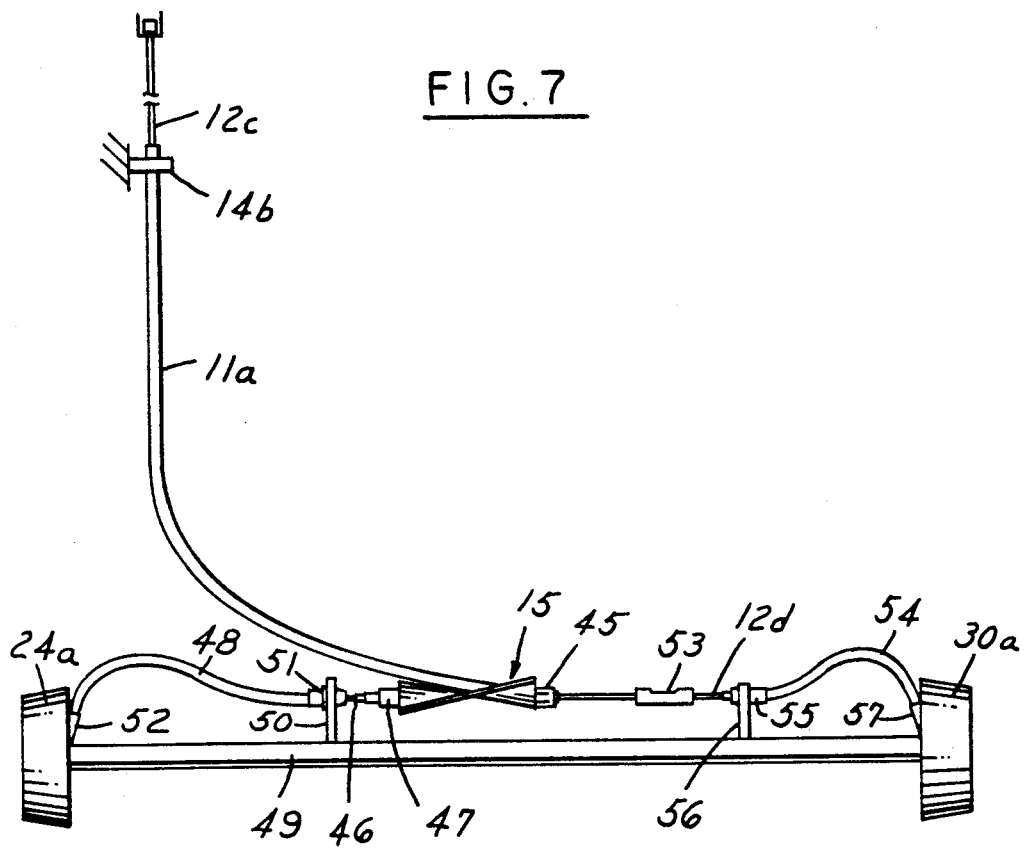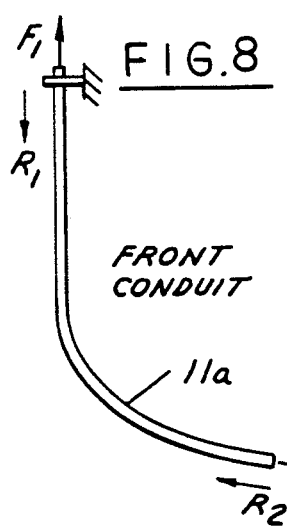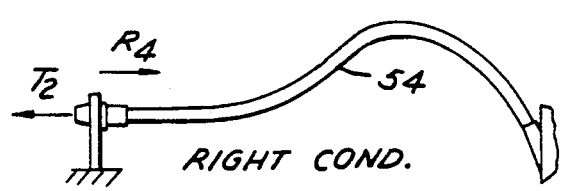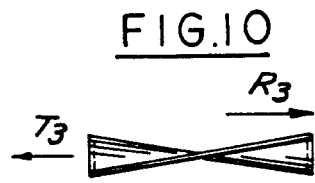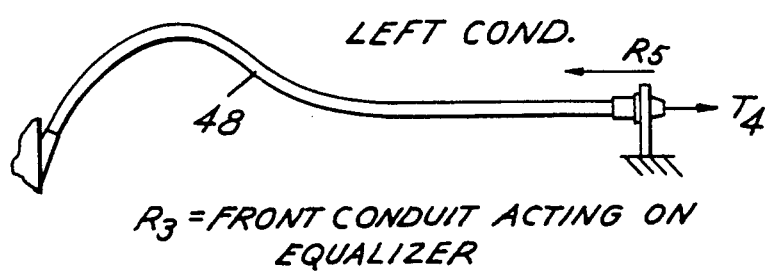

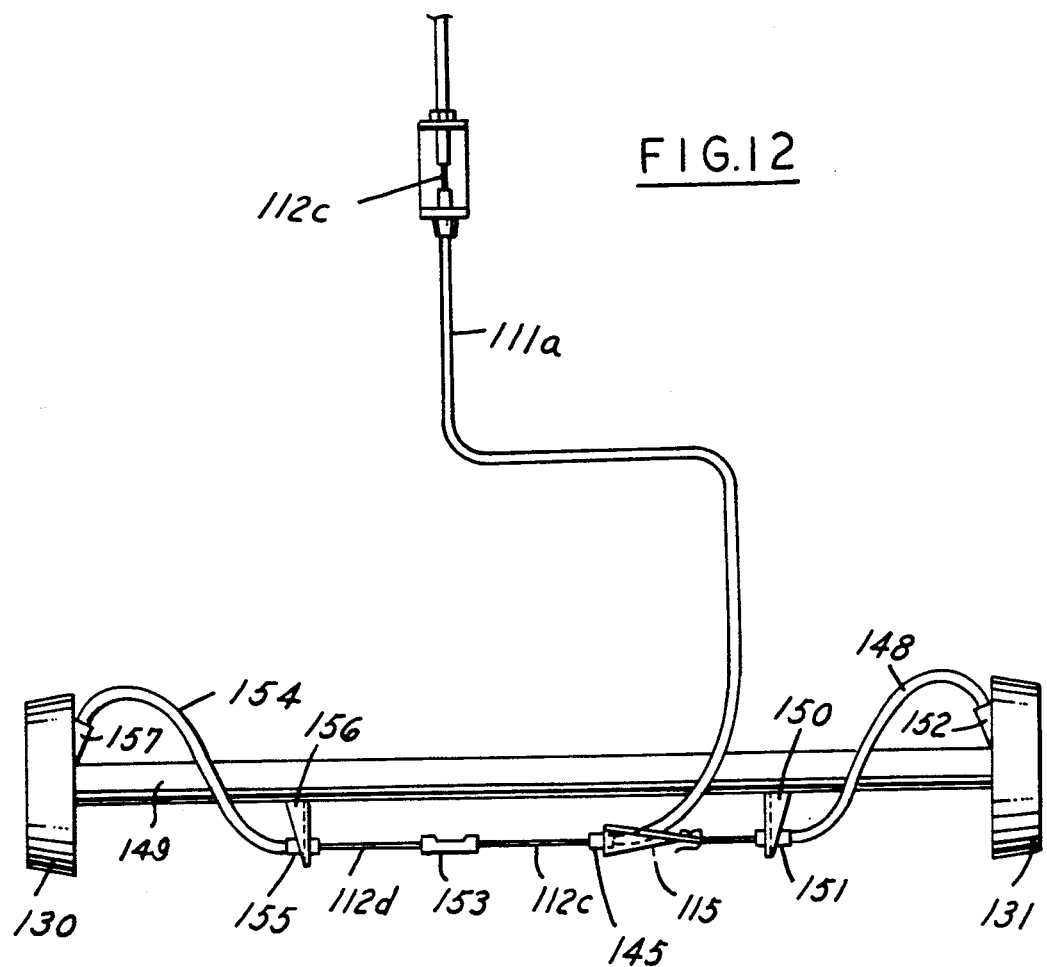
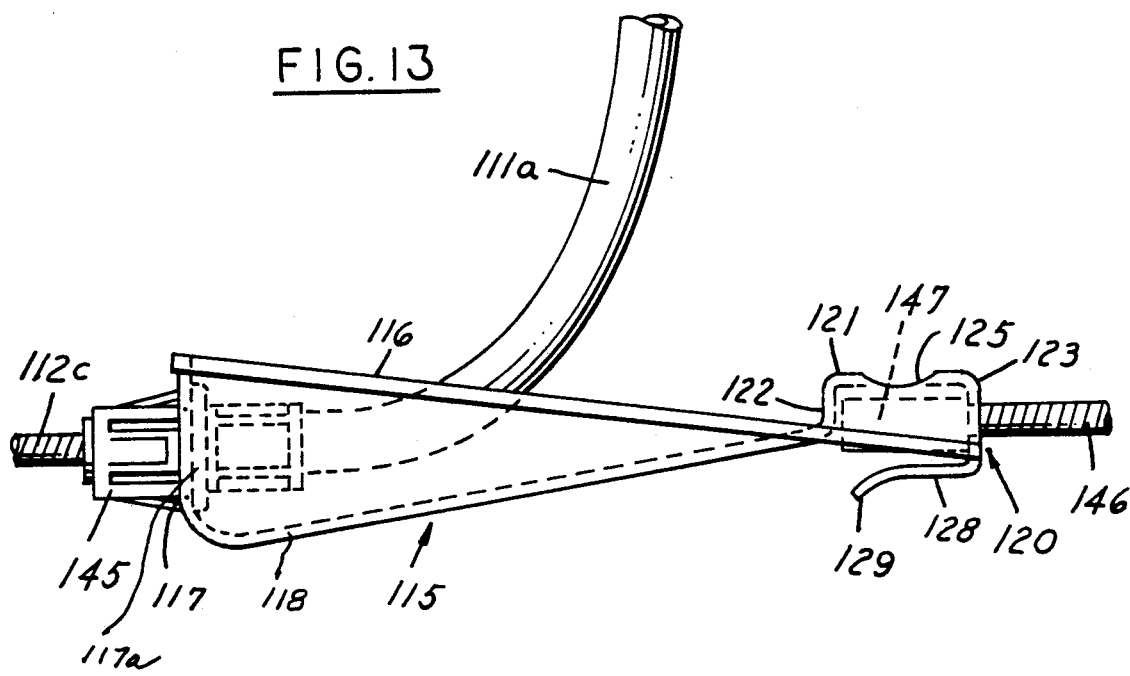

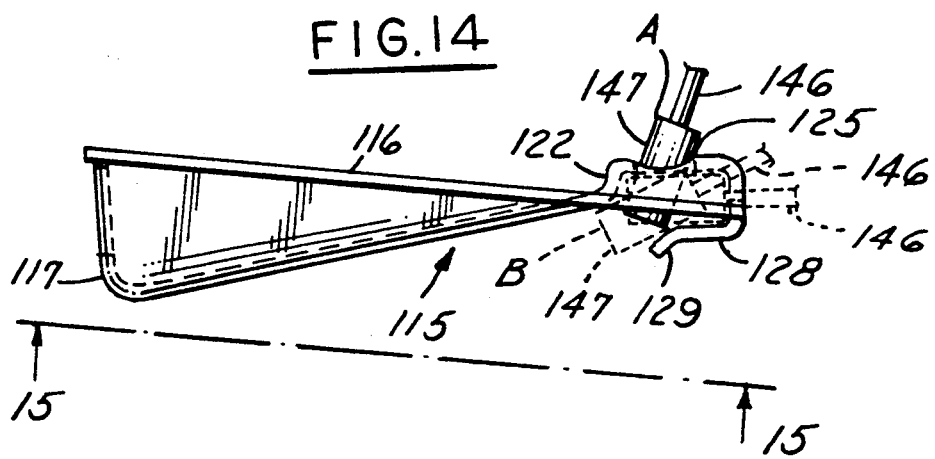
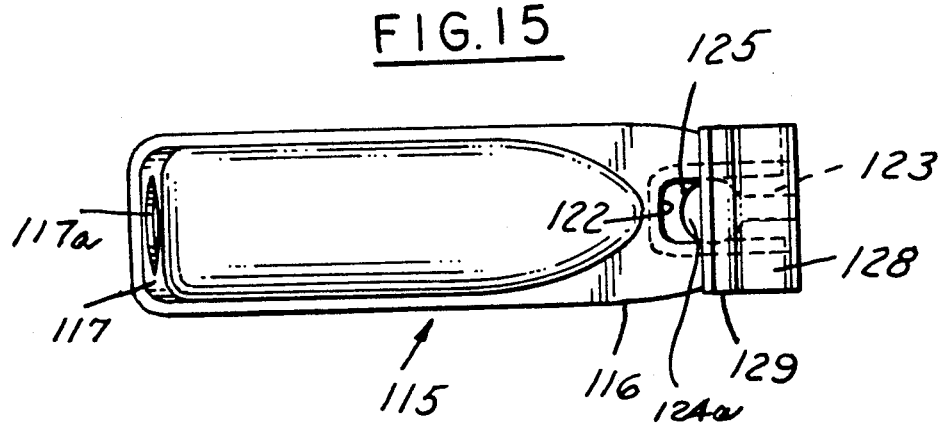
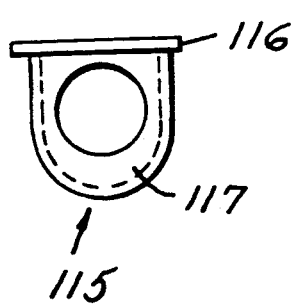
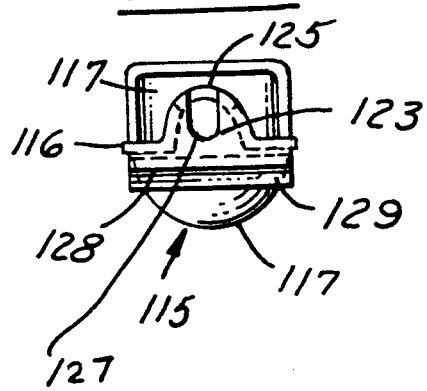
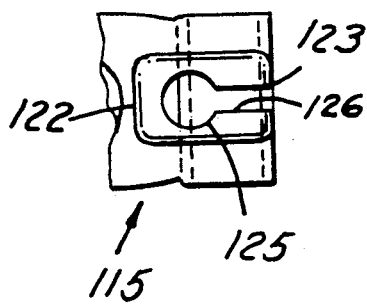

CABLE CONTROL SYSTEM FOR DUAL ACTUATORS

This invention relates to cable control systems.

BACKGROUND AND SUMMARY OF THE INVENTION

In cable control systems utilizing cables comprise conduits and strands through the conduits, one common type of application is that wherein a force is transmitted through plural cables to plural actuators. A typical example of such an arrangement is where a brake force is transmitted to a pair of brakes on an automotive vehicle. In such an arrangement, it is essential to provide some device for equalizing the forces applied to the cables. One typical device is made of sheet metal and has one cable attached to one end and another cable extending through the other end. It has been found that such an arrangement is costly to make and difficult to handle.

Accordingly among the objectives of the present invention are to provide a cable control system incorporating low cost reliable means for transmitting the forces to the cables equally; a device which can be readily mounted in position in the cable control system; and a device that can be easily attached to a cable to ship as a one part number assembly.

In accordance with the invention, a cable control system for dual actuators wherein movement of a strand of a first cable is transmitted equally to second and third strands of respective actuators which includes a device comprising a one-piece body having spaced parallel walls with aligned openings therethrough. The first cable extends through the opening and the second cable is fastened to the other end of the device such that when the first cable is actuated, a force is transmitted to one of the actuators and the reaction force on a conduit surrounding the first cable is transmitted through the device through the second cable and through the other of the actuators through the device and the second cable.

DESCRIPTION OF THE DRAWINGS

FIG. 1 is a partly diagrammatic view of a cable control system embodying the invention;

FIG. 2 is an elevational view of the force equalizing device utilized in the system;

FIG. 3 is a view taken along the line 3—3 in FIG. 2;

FIG. 4 is a view taken along line 4—4 in FIG. 2;

FIG. 5 is a fragmentary part sectional view through a portion of the system shown in FIG. 1;

FIG. 6 is a part sectional view of a prior art force equalizing device.

FIG. 7 is a partly diagrammatic view of a modified control system embodying the invention;

FIG. 8 is a free body force diagram of a portion of the system shown in FIG. 6;

FIG. 9 is a free body force diagram of another portion of the system shown in FIG. 6;

FIG. 10 is a free body force diagram of the force equalizing device shown in FIG. 6;

FIG. 11 is a free body force diagram of another portion of the system shown in FIG. 6;

FIG. 12 is a partly diagrammatic view of a modified control system utilizing an alternate force equalizing device;

FIG. 13 is a fragmentary side elevational view through a portion of the system shown in FIG. 12;

FIG. 14 is an elevational view of the alternate force equalizing device utilized in the system;

FIG. 15 is a view taken along the line 15—15 in FIG. 14;

FIG. 16 is an end view taken from the left in FIG. 15;

FIG. 17 is an end view taken from the right in FIG. 15; and

FIG. 18 is a fragmentary plan view through a portion of the alternate force equalizing device shown in FIG. 14.

DESCRIPTION

Referring to FIG. 1, a cable control system is shown comprising a cable 10 that includes a conduit 11 and a strand 12 attached to an operating device such as a foot pedal. The strand 12 comprises a first portion 12a and a second portion 12b with a connector 13 for facilitating assembly in the vehicle. Conduit 11 is fixed at one end to a fixed support 14a and at the other end to a fixed support 14b.

In accordance with the invention a free floating force equalizing device 15 may be made of metal, preferably a metal stamping. The force equalizing device 15 comprises a one-piece body that includes spaced generally parallel end walls 16, 17 having aligned openings 16a, 17a therein. The walls 16, 17 are interconnected by the remainder of the body which comprises a peripheral flange 18 that lies in a single plane such that the wall 16 extends in one direction from the flange while the wall 17 extends in an opposite direction. The device 15 further includes integral portions 19, 20 which are concave in cross section on a surface adjacent the flange and convex in cross section on an outer surface, as shown in FIG. 4. An intermediate planar portion 21 divides the portions 19, 20 from one another.

Referring to FIG. 5, the strand portion 12b extends through a conventional clip 22 and a conduit 23 to one brake 24 of the vehicle. The clip 22 has a flange 25 contacting the inner surface of the wall 16 of the device 15 and holding it against the inner surface of wall 16, and spring fingers 27 engaging the opposite surface of wall 16, in a manner well known in the art, as shown in U.S. Pat. No. 4,621,937, incorporated herein by reference.

A strand 28 extends through a conduit 29 to the brake 30 of the vehicle. Conduit 29 is fixed at one end by a bracket 31 and at the other end to the brake as at 32. The strand 28 extending to the other brake 30 is connected by a threaded shaft 33 into a threaded fitting 34 having a flange 35 contacting the inner surface of the wall 17 and held in position thereon by a serrated spring washer 36. A second clip 37 fixes the end of the conduit 29 on fixed bracket 31.

When a force is applied to the cable 12, it is transmitted to the one brake 24. The reaction force on the conduit 23 surrounding the strand 12 is applied through the device 15 and the strand 28 attached thereto to actuate the other brake 30. Inasmuch as the openings 16a, 17a in the walls are aligned, an equal force is applied to the other brake through the strand 28 fixed to the force equalizing device 15.

The force transmitting system embodying the invention may be contrasted to the prior art system as shown in FIG. 6 where the force equalizing device 40 comprises a metal body which is first stamped to the desired configuration and then rolled into a generally tubular construction. Such an arrangement requires a band 41 at one end for retaining the fitting 43 and requires that the other end be crimped as at 42 to the conduit connector in order to assemble the system in the vehicle.

In the modified form of the cable control system shown in FIG. 7, the positioning of the device 15 is arranged such that the strand 12 extends transversely rather than longitudinally of the vehicle. Otherwise the system is the same. In this form, the conduit 11a through which the strand 12 extends is fixed with on end to a bracket 14b and has its other end fixed to the inside wall of the device 15 by clip 45. A strand 46 is fixed by a clip 47 to the other wall of the force equalizing device 15 on extends through a conduit 48 to the brake 24a. Conduit 48 has one end thereof fixed to the axle 49 by bracket 50 and clip 51 and at the other end to the brake as at 52. The cable strand 12c extends through the clip 45 and through a connector 53 to a strand portion 12d and then through a conduit to the brake 30a. Conduit 54 is fixed at one end by a clip 55 to a bracket 56 on the axle 49 and at the other end to the brake as at 57.

As in the previous form of the invention, when the force is applied to the strand 12c, the brake 30a is actuated and the reaction forces also actuate the brake 24a.

The operation of this form is similar and can be understood by reference to the force diagrams shown in FIGS. 9–11 wherein the following table sets forth forces:

$F_1$ = is the brake actuating force
$R_1$ = bracket reacting on conduit 11a
$R_2$ = equalizer force acting on conduit 11a
$R_3$ = conduit 11a acting on equalizer
$R_4$ = bracket force reacting on conduit 54
$R_5$ = bracket force reacting on conduit
$T_1$ = strand tension force acting on conduit 11a
$T_2$ = strand force acting on conduit 54
$T_3$ = strand force acting on equalizer 15
$T_4$ = strand force acting on conduit 48

Another modified form of the cable control system shown in FIGS. 12 and 13 utilizes an alternate force equalizing device 115 made of metal, preferably a metal stamping. As shown in FIG. 13, this equalizing device 115 comprises a one-piece body that includes a peripheral flange 116 that lies in a single plane such that the wall 117 having an opening 117a extends in one direction on a generally acute angle from flange 116. The device 115 further includes an integral portion 118 which is concave in cross section on the surface adjacent the flange 116 and convex in cross section on an outer surface.

The device 115 also includes a second integral portion 120 that extends in a direction from the peripheral flange 116 opposite to the direction of the integral portion 118. Portion 120 includes a top wall 121 that is arcuate in cross section, an end wall 122 and is adjacent to an opposite end wall 123 corresponding to the wall 117 of the portion 118. The top wall 121 includes a key-shaped opening 124 including an enlarged circular portion 125 and a narrow slot portion 126. The end wall 123 includes an elongated open ended slot 127 that intersects the slot 126 of the top wall. A tab 128 extends from the wall 123 parallel to top wall 121 and the portion 118. Tab 128 has its free end 129 in spaced relationship to the integral portion 118 for purposes presently described.

In the modified cable control system of FIGS. 12 and 13, the end of conduit 111a is fixed on the end to the inside wall 117 by a clip 145. As shown in FIG. 13, a strand 146 has an enlarged end or anchor 147 fixedly attached thereto. The anchor 147 has a diameter larger than the width of slot 126 and 127 and slightly smaller than opening 125 and wall 123. FIG. 14 illustrates three positions for attachment. In position a anchor 147 is introduced into opening 125 in a generally upright angle and contacts free end 129 of tab 128. In position B, anchor 147 shown in phantom is moved along end 129 to approximately a 45° angle to permit the anchor to completely enter opening 125 and allow strand 146 to be received in slot 126. Position C shows in solid lines strand 146 through slot 127 and anchor 147 in contact with the inside surface of wall 123.

Strand 146 extends through a conduit 148 to brake 131. Conduit 148 has one end thereof fixed to the axle 149 by bracket 150 and clip 151 and at the other end of the brake 131 as at 152. The cable strand 112c extends through clip 145 and through a connector 153 to a strand portion 112d and then through a conduit 154 to brake 130. Conduit 154 is fixed at one end by clip 155 to a bracket 156 on the axle 149 and at the other end to the brake at 157.

As in the two previous forms of the invention when the force is applied to strand 112c, the brake 130 is actuated and the reaction forces also actuate the brake 131.

It can thus be seen that there has been provided a cable control system incorporating low cost reliable means for transmitting the forces to the cables equally; a device which can be readily mounted in position in the cable control system; and a device that can be easily attached to a cable to ship as a one part assembly.

I claim:

1. A cable control system for dual actuators comprising:
   (a) a one-piece force equalizing device having spaced parallel walls with aligned openings therethrough,
   (b) a first cable having a first strand and an associated conduit fixed to one wall of said device and extending to a first actuator, and
   (c) a second cable having a second strand fixed to the other end of said device and extending to another actuator such that a force is transmitted to one of the actuators through said first cable and the reaction force on said conduit surrounding said first strand is transmitted through said device through said second strand to the other of the actuators through said device,
   said device having a peripheral flange lying in a single plane with one of said walls extending laterally from said plane in one direction and the other of said walls extending laterally in the opposite direction,
   said device including integral spaced portions adjacent each wall, each portion being concave in cross section on a surface adjacent the flange and convex in cross section adjacent its outer surface.

2. The cable control system as set forth in claim 1 wherein said device includes an intermediate planar portion between said spaced portions.

3. The cable control system as set forth in claim 2 wherein said device comprises a metal body.

4. The cable control system as set forth in claim 2 wherein said device comprises a metal stamping.

5. The cable control system as set forth in claim 1 wherein said force equalizing device comprises a threaded fitting adjacent one said wall for receiving the threaded end of a cable.

6. A cable control system for dual actuators comprising:
   (a) a one-piece force equalizing device having spaced parallel walls with aligned openings therethrough,
   (b) a first cable having a first strand and an associated conduit fixed to one wall of said device and extending to a first actuator, and
   (c) a second cable having a second strand fixed to the other end of said device and extending to another actuator such that a force is transmitted to one of the actuators through said first cable and the reaction force on said conduit surrounding said first strand is transmitted through said device through said second strand to the other of the actuators through said device,
   one of said walls having an elongated open ended slot of receiving said second strand, said second strand having an enlarged end engaging a surface of said wall for retaining said strand in position,
   said device having a peripheral flange lying in a single plane with one of said walls extending laterally from said plane in one direction and the other of said walls extending laterally in the opposite direction,
   said device including integral spaced portions adjacent each wall, each portion being concave in cross section on a surface adjacent the flange and convex in cross section adjacent its outer surface.

7. The cable control system as set forth in claim 6 wherein one of said integral spaced portions adjacent said wall having said slot therein includes a top wall with a key-shaped opening having an enlarged and narrow portion, said narrow portion intersecting said slot in said wall, said enlarged portion of said opening being adapted to receive said enlarged end of said second strand during attachment of the second cable to said device.

8. The cable control system as set forth in claim 7 wherein said device includes a tab extending from said wall having said slot therein parallel to said wall having said key-shaped opening and toward said other integral spaced portion, said tab having a free end spaced from said other integral spaced portion such that said enlarged end of said strand of said second cable is guided by engagement with said free end of said tab during the attachment of said strand of said second cable to said wall having said slot therein.

9. The cable control system as set forth in claim 8 wherein said device comprises a metal body.

10. The cable control system as set forth in claim 8 wherein said device comprises a metal stamping.

11. A one-piece force equalizing device for attachment of a first cable and a second cable each of which has a conduit and a strand, said device comprising,
   a one-piece body having spaced parallel walls with aligned openings therethrough, such that a conduit of said first cable may be attached to one wall and a second strand of said second cable may be attached to the other wall,
   said one-piece body having a peripheral flange lying in a single plane with one of said walls extending laterally from said plane in one direction and the other of said walls extending laterally in the opposite direction,
   said one-piece body including integral spaced portions adjacent each wall, each portion being concave in cross section on a surface adjacent the flange and convex in cross section adjacent its outer surface.

12. The one-piece force equalizing device as set forth in claim 11 wherein said one-piece body includes an intermediate planar portion between said spaced portions.

13. The one-piece force equalizing device as set forth in claim 12 wherein said one-piece body comprises a metal body.

14. The one-piece force equalizing device as set forth in claim 12 wherein said one-piece body comprises a metal stamping.

15. The one-piece force equalizing device as set forth in claim 14 wherein one of said integral spaced portions adjacent said wall having said slot therein includes a wall with a key-shaped opening having an enlarged and narrow portion, said narrow portion intersecting said slot in said wall, said enlarged portion of said opening being adapted to receive said enlarged end of said second strand during attachment of said second cable to said one-piece body.

16. A one-piece force equalizing device as set forth in claim 15 wherein said one-piece body includes a tab extending from said wall having said slot therein parallel to said wall having said key-shaped opening and toward the other integral spaced portion, said tab having a free end spaced from said other integral spaced portion such that said enlarged end of said strand of said second cable is guided by engagement with said free end of said tab during attachment of said strand of said second cable to said wall having said slot therein.

17. A one-piece force equalizing device for attachment of a first cable and a second cable each of which has a conduit and a strand, said device comprising,
   a one-piece boy having spaced parallel walls with aligned openings therethrough, such that a conduit of said first cable may be attached to one wall and a second strand of said second cable may be attached to the other wall,
   one of said walls having an elongated open ended slot for receiving said second strand, said second strand having an enlarged end engaging a surface of said wall for retaining said strand in position,
   said one-piece body having a peripheral flange lying in a single plane with one of said walls extending laterally from said plane in one direction and the other of said walls extending laterally in the opposite direction,
   said one-piece body including integral spaced portions adjacent each wall, each portion being concave in cross section on a surface adjacent the flange and convex in cross section adjacent its outer surface.

18. A cable control system for dual actuations comprising:
   (a) a one-piece force equalizing device having spaced parallel walls with aligned openings therethrough,
   (b) a first cable having a first strand and an associated conduit fixed to one wall of said device and extending to a first actuator, and
   (c) a second cable having a second strand fixed to the other end of said device and extending to another actuator such that a force is transmitted to one of the actuators through said first cable and the reaction force on said conduit surrounding said first strand is transmitted through said device through said second strand tot he other of the actuators through said device, said device including an integral spaced portion adjacent each of the respective parallel walls, said spaced portions defining hollow spaces one of which extends laterally in one direction and the other of which extends laterally in the opposite direction with respect to a plane interconnecting said parallel walls.

19. The cable control system set forth in claim 18 wherein one of said walls having an elongated open ended slot for receiving said second strand, said second strand having an enlarged end engaging a surface of said wall for retaining said strand in position, one of said integral spaced portions adjacent said wall having said slot therein includes a top wall with a key-shaped opening having an enlarged and a narrow portion, said narrow portion intersecting said slot in said wall, said enlarged portion of said opening being adapted to receive said enlarged end of said second strand during attachment of the second cable to said device.

20. A one-piece force equalizing device for attachment of a first cable and a second cable each of which has a conduit and a strand, said device comprising:

a one-piece body having spaced parallel walls with aligned openings therethrough, such that a conduit of said first cable may be attached to one wall and a second strand of said second cable may be attached to the other wall, said device including an integral spaced portion adjacent each of the respective parallel walls, said spaced portions defining hollow spaces one of which extends laterally in one direction and the other of which extends laterally in the opposite direction with respect to a plane interconnecting said parallel walls.

21. The one-piece equalizing device set forth in claim 20 wherein one of said walls having an elongated open ended slot for receiving said second strand, said second strand having an enlarged end engaging a surface of said wall for retaining said strand in position, one of said integral spaced portions adjacent said wall having said slot therein includes a top wall with a key-shaped opening having an enlarged and narrow portion, said narrow portion intersecting said slot in said wall, said enlarged portion of said opening being adapted to receive said enlarged end of said second strand during attachment of said second cable to said one-piece body.

* * * * *